United States Patent [19]

Motegi et al.

[11] 4,138,386

[45] Feb. 6, 1979

[54] POLYESTER FILM FOR MAGNETIC TAPE

[75] Inventors: Masahiko Motegi, Hikone; Saburo Fujita, Otsu; Kazuo Okabe, Kyoto; Yasuki Miura, Otsu; Satoyuki Minami, Mishima, all of Japan

[73] Assignee: Toray Industries, Inc., Tokyo, Japan

[21] Appl. No.: 837,984

[22] Filed: Sep. 29, 1977

[30] Foreign Application Priority Data

Sep. 29, 1976 [JP] Japan .................................. 51-116066

[51] Int. Cl.$^2$ .......................... C08K 3/26; C08K 3/32; C08K 5/09; C08K 5/52

[52] U.S. Cl. ........................ 260/40 R; 260/DIG. 35; 528/273; 260/860

[58] Field of Search ........... 260/40 R, 75 R, DIG. 35

[56] References Cited

U.S. PATENT DOCUMENTS

| | | | |
|---|---|---|---|
| 3,962,189 | 6/1976 | Russin et al. | 260/75 R |
| 4,008,207 | 2/1977 | Omoto et al. | 260/75 R |

*Primary Examiner*—Sandra M. Person
*Attorney, Agent, or Firm*—Miller & Prestia

[57] ABSTRACT

Polyester film for magnetic tape including discrete polyester particles containing lithium, calcium and phosphorus, said particles having an average size in the range from 0.1 to 3.0 μm and inert pigments having an average size of 1.0 to 10.0 μm.

Magnetic tape from this film has improved abrasion resistance and reduced the occurrence of "drop out".

16 Claims, No Drawings

POLYESTER FILM FOR MAGNETIC TAPE

BACKGROUND OF THE INVENTION

This invention relates to a biaxially stretched polyester film suitable for magnetic tape having improved abrasion resistance, slipperiness and reduced occurrence of "drop out".

In general, polyester film, especially polyethylene terephthalate film is used wherever a magnetic, photographic, or electric film is needed. Film used in magnetic tapes, discs and sheets is coated or metallized on one side of the film with magnetizable metal oxide. These coated films are finding an ever-increasing number of applications including audio and video tapes and data storage devices.

The thickness of the coated magnetic layer for a typical video cassette is about 5 $\mu$m and the thickness of the metallized magnetic layer is about 1 $\mu$m.

However, thin film is generally not very slippery and this prevents the formation of smooth, regular rolls of magnetic tape. Accordingly the base film must be very slippery. Furthermore, roughness on the base film surface damages the thin magnetic layer causing "drop out" or loss of minute portions of the magnetic material itself, causing loss of information. So, the base film must have a smooth surface.

In producing and using magnetic tape, there is considerable physical contact of the film with the equipment. This causes the film to abrade and this forms a white polyethylene terephthalate powder. The useful life of the magnetic tape is significantly decreased. White powder on the surface of the uncoated side of the film is deposited on the coated side covering portions of the coating when the tape is wound. This powder can cause separation of the tape from the reading head, resulting in a loss of information, i.e., "drop out". To remedy this, the base film must have improved abrasion resistance.

It is well known that there are many methods for improving the slipperiness of polyester film. For example, pigments such as $SiO_2$, $TiO_2$, clay or bentonite in film is described in U.S. Pat. No. 3,821,156, British Pat. No. 1,359,892, U.S. Pat. No. 3,980,611, U.S. Pat. No. 3,884,870, British Pat. No. 1,306,634 and U.S. Pat. No. 3,221,226. This procedure is hereinafter referred to as the "pigment method". Another method for forming particles from a catalyst or stabilizer during the polymerization process is described in U.S. Pat. No. 2,921,051, U.S. Pat. No. 3,048,564 and British Pat. No. 1,398,178 and is hereinafter referred to as the "polyester particles method". Explaining the latter method in more detail: residues of a compound such as a catalyst, stabilizer or additive react with polyester components such as monomers or oligomers. The product of this reaction forms particles which are insoluble in the polymer.

A polyester film with good slipperiness and reduced vulnerability to "drop out" for use as video tape, should have the following characteristics. The maximum surface roughness should be in the range of from 0.02 to 0.5 $\mu$m, preferably from 0.05 to 0.35 $\mu$m, and the density of surface protrusions should be at least 20 surface protrusions per mm. Especially rough protrusions may damage the thin coating so the number of rough protrusions having a height of 0.35 to 0.5 $\mu$m should be no more than ten protrusions per mm$^2$.

However, the inclusion of pigments in amounts large enough to produce asperities on the film surface required for improved slipperiness is often accompanied by agglomeration of pigments and increasing occurrences of "drop out". The inclusion of pigments to improve slipperiness does essentially nothing to improve the abrasion resistance.

On the other hand, the tendency of polyester particles to agglomerate is somewhat less than that of pigments in general. However, well known polyester particles formed from alkaline earth metals or their compounds are accompanied by numerous rough protrusions with heights of at least 0.35 $\mu$m and thus increases the occurrence of "drop out". Furthermore, we have tried to produce a film with smaller polyester particles containing lithium alone or in combination with calcium and phosphorus, but such particles failed to improve the abrasion resistance of the film. Also, the inclusion of both pigments and polyester particles containing calcium and phosphorus has been known in the art and is described in Japan Kokai 51-81811. Here also there is no improvement in the abrasion resistance or reduction in the occurrence of "drop out".

It is an object of the present invention to provide an improved base film for magnetic tape. The magnetic tape made from film of this invention has excellent winding, slipping and moving characteristics, reduction in occurrence of "drop out", and outstanding resistance to abrasion. Another object of the present invention is to provide a polyester film which is especially suitable for video tape. A further object of the invention is to provide a polyester film which is suitable for audio tape.

A film according to this invention is a biaxially oriented polyester film for magnetic tape consisting essentially of ethylene terephthalate units, said film including polyester particles in an amount from about 0.05% to 1.0%, by weight, said particles having an average size of about 0.10 to 3.0 $\mu$m and containing about 0.03% to 5.0%, by weight, lithium, about 0.03% to 5.0%, by weight, calcium and about 0.03% to 10.0%, by weight, phosphorus. Said film also includes in an amount of about 0.001% to 0.7%, by weight, inert pigments, said pigments being selected from the group consisting of oxides or salts of elements in Groups II, III or IV of the periodic table and having an average size of about 1.0 to 10.0 $\mu$m. Other and further objects, features and advantages of this invention will become more fully apparent from the following detailed description. The term "average size" is defined as the diameter of the sphere which most closely approximates the volume of the particle in the film.

DETAILED DESCRIPTION OF THE INVENTION

The unique feature of film of this invention is the presence of any specified amounts of individual, discrete, spaced-apart polyester particles and inert pigments within the film. The films including these separate binary particles have superior abrasion resistance compared with films including only specified polyester particles or films including only inert pigments. The cause of this synergistic result is not clearly understood at this writing.

The amount of polyester particles in the film should be 0.05% to 1.0%, by weight, and preferably 0.1% to 0.5%, by weight. If the amount is less than 0.05%, there is little or no beneficial effect on the abrasion resistance, slipperiness and roll formation. On the other hand, if the amount is greater than 1.0%, not only does the abrasion resistance fail to improve, but many problems in the polymerization process tend to occur.

An average size of polyester particles should be 0.1 to 3.0 μm, and preferably 0.6 to 2.5 μm. If the particle is less than about 0.1 μm, there is little or no beneficial effect on slipperiness or the abrasion resistance. A size of more than about 3.0 μm fails to improve the abrasion resistance.

Furthermore, the polyester particles should contain about 0.03% to 5.0%, by weight, based upon the weight of the polyester particles, of both lithium and calcium and preferably about 0.05% to 4.0% of each. Said particles should also contain about 0.03% to 10.0% phosphorus, preferably about 0.05% to 7.5%. If the amount of lithium or calcium is less than about 0.03% or if the amount of phosphorus exceeds about 10.0%, it is impossible to form sufficient polyester particles to improve the abrasion resistance and slipperiness of the film. If the amount of lithium or calcium is more than about 5.0%, or if the film contains less than about 0.03% phosphorus, agglomeration of particles may occur, thus preventing improvement of the abrasion resistance and reduction in the occurrence of "drop out". Inert pigments and polyester particles in the film of this invention are further differentiated by the method described below.

In general, polyester particles are considered to be formed by the reaction of polyester components such as monomers or oligomers with lithium, calcium and phosphorus compounds added during the polymerization reaction. The chemical composition of a particle thus formed may be either:

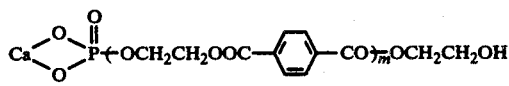

or:

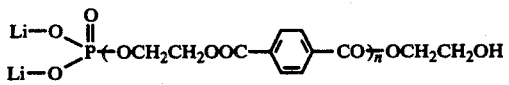

(where m, n are integers from 1 to 4). Polyester particles of this invention can be dispersed throughout the film without agglomeration occuring if lithium or calcium, or compounds of lithium and phosphorus, or calcium and phosphorus are used. The film thus formed exhibits excellent properties such as reduced occurrence of "drop out".

Polyester particles of this invention may also contain a small amount of other metals such as Zn, Mn, Mg, Co, Sb, Ge and Ti unless the effects of this invention are prevented by such inclusion.

Particles in the film can be separated by:
(1) washing the film with methanol;
(2) washing with water and drying;
(3) mixing approximately 300g of film with 2.7 kg of o-chlorophenol;
(4) heating the mixture to 100° C. while stirring;
(5) continuing stirring for an hour at the same temperature so that the mixture is completely dissolved;
(6) cooling the solution to room temperature;
(7) filtering through a G-1 glass filter to remove possible contamination such as dust;
(8) pouring the filtered liquid into a cell of an ultra centrifuge;
(9) centrifuging the cell at a rate of 30,000 rotations per minute at room temperature;
(10) decanting the supernatant liquid;
(11) removing the liquid under reduced pressure and drying the remaining particles for 16 hours at 120° C., and finally;
(12) weighing the dried particles.

Sometimes the initial dissolution does not completely dissolve the highly crystallized parts of the polymer. The polymer should then be melted and successively quenched prior to the dissolution treatment.

For the centrifuging a Roter RP-30 may be set in an ultra centrifuge 40P (made by Hitachi Seisakusho Co. Ltd.) and 30 ml of the solution is poured into a cell. The rotor is rotated at 4500 rpm. After assuring smooth rotation, the equipment is evacuated and the rotating speed is increased to 30,000 rpm for 40 minutes. If it is necessary, the completion of sedimentation can be confirmed in the following way.

The light transmission at 375 mμ of the liquid after sedimentation is measured and if this value reaches a constant value higher than before sedimentation, it can be concluded that the sedimentation is completed. In order to remove any remaining polymer component in the sedimented particles, o-chlorophenol at room temperature may be added to the separated particles and mixed to form a homogeneous emulsion, and ultra centrifugation may be repeated. This operation is repeated until the melting point of the polymer cannot be detected when the separated particles are analyzed by a differential scanning calorimeter after drying. The particles separated by this operation are a mixture of inert pigments and polyester particles. The mixture can be separated again by:
(13) measuring the amounts of lithium, calcium and phosphorus contained in the mixture;
(14) mixing with about three times as many moles of ethylene glycol;
(15) heating the mixture to reflux for at least 6 hours to dissolve the polyester particles;
(16) centrifuging the undissolved particles;
(17) drying and weighing the separated particles, which are inert pigments and finally;
(18) measuring lithium, calcium and phosphorus contained therein. The difference between steps (12) and (17) is the amount of polyester particles in the film. The difference between steps (13) and (18) is the lithium, calcium and phosphorus contained in the polyester particles.

The average size of inert pigments in the film of this invention should be about 1.0 to 10.0 μm, preferably about 1.5 to 7.0 μm. Furthermore it is preferred that the average size of inert pigments be greater than that of the polyester particles. The amount of pigments should be about 0.001% to 0.7% by weight, and preferably about 0.003% to 0.5% by weight. If the average size is outside of that specified above, or if the amount is outside of this range, the abrasion resistance of the film will not be improved.

The inert pigments are selected from the group consisting of oxides or salts of elements in Groups II, III, or IV of the periodic table. Representative pigments are $CaCO_3$, $CaSO_4$, $Ca(H_2PO_4)_2$, $CaHPO_4$, $Ca_3(PO_4)_2$, $MgO$, $MgCO_3$, $BaSO_4$, $Ba_3(PO_4)_2$ from Group II, $Al_2O_3$ from Group III, and $SiO_2$, $ZrO_2$ from Group IV. It is possible to use plural pigments.

The polyester polymer of the film of this invention has an intrinsic viscosity above about 0.2 deciliters per gram and preferably 0.4 to 0.1 deciliters per gram, as measured in o-chlorophenol at 25° C., and essentially consists of ethylene terephthalate units. The polyester may be a homopolymer or a copolymer. However, the copolymerization ratio should be under about 20 mole %. The dicarboxylic acid used as the copolymerizing component is aliphatic dicarboxylic acid having 4 to 14 carbon atoms, or an aromatic dicarboxylic acid having 8 to 17 carbon atoms. Examples include adipic acid, sebacic acid, isophthalic acid, 5-sodium sulpho isophthalic acid, 2, 6-naphthalene dicarboxylic acid, p,p'-diphenoxyethane dicarboxylic acid, 4,4'-benzophenone dicarboxylic acid. Glycol can be used as a copolymerizing component in an aliphatic diol containing 3 to 10 carbon atoms, or a cyclo diol containing 6 to 10 carbon atoms, and an aromatic diol containing 6 to 15 carbon atoms. Suitable compounds include diethylene glycol, propylene glycol, 1,4-butane diol, neopentylene glycol, polyethylene glycol, 1,4-cyclohexane dimethanol, p-xylene dimethanol. The oxycarboxylic acid used as copolymerizing component contains 7 to 15 carbon atoms and p-oxyethoxy benzoic acid is usually used. Furthermore, a material having more than 2 polyfunctional groups, such as trimellitic acid, pyromellitic acid and glycerol is used.

The polyester polymer of the film of this invention may be produced by addition of inert pigments and glycol-soluble lithium, calcium and phosphorus compounds in the course of an ester reaction or ester-interchange reaction, or polymerization. It is preferred to add lithium, calcium and phosphorus compounds in ethylene glycol solutions to the system prior to starting polymerization, or during a pre-polymerization stage. The amount of lithium, calcium and phosphorus compounds added is not restricted. But the amount of the lithium compound added is preferably about 0.005% to 0.3%, by weight. The amounts of the calcium compound and the phosphorus compound added are both preferably about 0.01% to 0.5%, by weight. The mole ratio of lithium and phosphorus is preferably about 0.1 to 10.0 to form particles dispersed throughout the film without agglomeration in the polymer. If the amounts is outside of these ranges, the desired polyester particles fail to form and also many problems tend to occur during the polymerization process. This results in many defects in the properties of the polymer such as low softening point or low heat resistance.

The lithium compound is preferably a glycol-soluble compound such as lithium chloride, lithium iodide or lithium acetate. The calcium compound is taken from the group consisting of calcium hydrite, calcium hydroxide, calcium chloride or a salt of mono- or dicarboxylic acid containing 2 to 6 carbon atoms. Glycol-soluble salts of aliphatic mono- or dicarboxylic acid such as calcium acetate and calcium oxalate are preferable. A phosphorus compound with valence of 3 or 5 is used. An acid or ester with valence of 5 is preferable. Examples include phosphorous acid, trimethylphosphite, triphenylphosphite, phosphoric acid, trimethylphosphate, triphenylphosphate, dimethyl methylphosphonate, diphenyl phenyl phosphonate, and dimethyl phenylphosphonate. It is possible, and in the case of phosphorus, sometimes preferable, to use plural lithium, calcium and phosphorus compounds.

Inert pigments may be added during the ester or ester-interchange reaction or polymerization, or after polymerization. During the reaction, the inert pigments are preferably added in a slurry of ethylene glycol. After polymerization, it may be added and mixed in an extruder.

After the polyester polymer including polyester particles and inert pigments has been produced, the polymer is extruded on a casting drum, and biaxially stretched, i.e., stretched in longitudinal and transverse directions in either order or simultaneously. The stretch ratio can usually range from about 2.5 to 5.5 times the original dimension. The stretching operation is usually carried out at temperatures ranging from 70° C. to 160° C. If necessary, the film can be stretched again longitudinally. The stretch ratio can range from about 1.1 to 3.0 times the original dimension. The stretching operation is carried out at temperatures ranging from about 100° C. to 200° C. After the film has been stretched, it is heat set. The heat setting temperature ranges from about 170° C. to 250° C., and preferably from about 190° C. to 230° C. The stretching and heat setting conditions are not restricted to these conditions.

In order to use the improved film of the present invention in magnetic tape applications such as video tape, it is necessary that the maximum surface roughness of the base film be about 0.02 to 0.05 μm, preferably about 0.05 to 0.35 μm and the density of surface protrusions be at least about 20 per mm. This reduces the occurrence of "drop out" and further provides good slipperiness properties. Especially rough protrusions are undesirable, so the number of rough protrusions with heights of about 0.35 to 0.5 μm should be no more than about 10 per mm$^2$. This highly desirable magnetic tape is produced easily from the film of this invention. However, even if the surface roughness is within these ranges, it is considered impossible to improve the film's abrasion resistance without the polyester particles and pigments specified in this invention.

The formation of the thin magnetic layer on the base film can be effected by various well known methods. The film may be coated with a dispersion coating consisting of fine magnetizable particles such as $\gamma$-$Fe_2O_3$, $Fe_3O_4$, or $\gamma$-$Fe_2O_3$ doped with Co or alloys of Co, Fe or Ni dispersed in a nonmagnetic solution containing binders, additives and solvents. Poly (vinyl chloride-acetate) and epoxy resins are typical examples of polymeric binders. However, various other types of known polymeric binders can also be used.

The dispersion coating may be applied to the film by use of well known coating procedures such as gravure rolls, reverse rolls and devices of the doctor blade type. Magnetic-aligning and buffing or calendering are done to the magnetic tape before or after the coating process. The thin magnetic layer may be plated on to the base film to form the magnetic tape of this invention.

EXAMPLES

This invention is further illustrated by the following specific examples. In these examples, the quantitative analysis of the amounts of lithium, calcium and phosphorus contained in separated particles and the measurements of other properties are performed as follows:

(A) Quantitative analysis of lithium: Sulphuric acid is added to a sample of separated particles to make a wet ash. The ash is heated for 1 hour 600° C. and dissolved in aqueous hydrochloric acid. The lithium is then analyzed quantitatively by atomic absorption spectroscopy.

(B) Quantitative analysis of calcium: Separated particles are heated for 2 hours at 100° C. to an ash; then the ash is dissolved in aqueous hydrochloric acid. Then the calcium is analyzed by atomic absorption spectroscopy.

(C) Quantitative analysis of phosphorus: A wet ash is made of separated particles by adding sulphuric acid and perchloric acid. After adding ammonium molybdate to the ash, a color appears. The peak absorbance of this solution is measured at a wavelength of 845 mµ. The phosphorus content is determined by using well known spectrophotometric techniques.

(D) The static coefficient of friction of the film is measured by a slip-tester according to ASTM D-1894.

(E) Maximum surface roughness of film is measured by:
(1) evaporating Al on the film surface;
(2) observing the film surface by use of a reflected light interference microscope under 100X magnification;
(3) observing five clear optically-coherent lines;
(4) measuring the height of protrusions on these lines;
(5) and determining the maximum height, which is the maximum surface roughness.

(F) The density of surface protrusions: Film surface is measured by a needle roughness analyzer. The number of protrusions per mm is the density of surface protrusions.

(G) The quantity of "white powder": Film is cut into strips 1.27 cm wide. This tape is passed over a stationary metal guide roll at a speed of 5m/min. The quantity of "white powder" formed is measured with the eye.

| RANK | 1 | very good (No "white powder") |
| --- | --- | --- |
| | 2 | good |
| | 3 | average |
| | 4 | bad |
| | 5 | very bad (Considerable "white powder") |

EXAMPLE I 100 parts of dimenthyl terephthalate and 70 parts of ethylene glycol were transesterified in the presence of 0.035 parts of manganese acetate, as catalyst. Then 0.04 parts of antimony trioxide, 0.15 parts of lithium acetate and 0.09 parts of a solution of calcium acetate in ethylene glycol, 0.03 parts of calcium carbonate having an average size of 2.0 µm in an ethylene glycol slurry and 0.13 parts of trimethylphosphate were combined and polymerized. A product having an intrinsic viscosity of 0.63 and a softening point of 259.7° C. was obtained.

The particles separated from the polymer by the method using o-chlorophenol described above, comprised 0.53% by weight. The particles were subjected to elemental quantitative analyses for carbon, hydrogen, lithium, calcium and phosphorus. The particles were found to contain 48.4%, by weight, carbon, 4.0% hydrogen, 1.7% lithium, 2.5% calcium and 4.6% phosphorus.

These particles should contain both polyester particles dand added calcium carbonate of 0.03 parts. To confirm this, the particles were treated with ethylene glycol. The separated particles were found to be calcium carbonate only, and comprised 0.03%, by weight. The polymer was then pressed between two pieces of glass and placed on a hot plate at 290° C. to make a thin film. It was then observed with a microscope. Many particles of about 0.6 µm and a few particles of from 2.0 to 2.5 µm were observed. The latter may be calcium carbonate.

Dried polymer was melted at 290° C. and then extruded on a casting drum to form a continuous sheet. The sheet was subjected to longitudinal stretching of 3.3 times its original length and then to a transverse stretching of 3.4 times its original width. The sheet was stretched at 95° C. The film was then heat set at 210° C.

The resulting biaxially stretched film had the following characteristics: A thickness of 24 µm, static coefficient of friction of 0.52 (good slipperiness), density of surface protrusions of 48 protrusions per mm and maximum surface roughness of 0.26 µm. On the film surface, many fine protrusions having a height of about 0.15 µm and a few rough protrusions with a height no more than 0.26 µm were observed under a microscope.

Also, this film had a rank of 1 for "white powder", which made it suitable for use as magnetic film.

EXAMPLES 2, 3, 4, 5 and 6, COMPARATIVE EXAMPLES 1, 2, 3, 4, AND 5

Polyethylene terephthalate films of Examples 2, 3, 4, 5 and 6, Comparative Examples 1, 2 and 3 were prepared in the manner described in Example 1 excepting the amount of calcium carbonate, i.e., 0.001% in Example 2, 0.003% in Example 3, 0.1% in Example 4, 0.5% in Example 5, 0.7% in Example 6, 0% in Comparative Example 1 (polyester particles only included), 0.0008% in Comparative Example 2, and 1.0% in Comparative Example 3. Films of Comparative Examples 4 and 5 were prepared individually in the manner of Examples 1 and 5 except that lithium and calcium acetate were not added. Particles of 2.0 to 2.5 µm were found in the films of Comparative Examples 4 and 5. These particles were calcium carbonate and no polyester particles were observed.

The comparative results of "white powder" rank, along with other data, are summarized in Table 1. The films of these Examples had outstandingly improved abrasion resistance compared with the Comparative Examples. It is clear that polyester particles and inert pigments should be added to the film simultaneously and that the amount of inert pigments should be within the scope of this invention.

COMPARATIVE EXAMPLE 6, 7 AND 8

A film of Comparative Example 6 was prepared in the manner of Example 1, except that lithium acetate was not added. Calcium carbonate pigments of 2.0 to 2.5 µm and 0.22%, by weight, polyester particles containing calcium and phosphorus of about 1.5 µm were observed in the film. A film of Comparative Example 7 was prepared in the manner of Comparative Example 6, except 0.1%, by weight, calcium carbonate having an average size of 6 µm was substituted for the calcium carbonate of Comparative Example 6.

The films of these Comparative Examples had poor abrasion resistance as indicated in Table 1. The inclusion of both polyester particles outside of the scope of this invention and inert pigments failed to improve the abrasion resistance of the film.

A film of Comparative Example 8 was prepared in the manner of Comparative Example 4 except that 0.3%, by weight, silica having an average size of 0.5 µm is also added. Many silica particles of about 0.8 µm and a few calcium carbonate particles of 2.0 to 2.5 µm were observed.

But this film had poor abrasion resistance, as indicated in Table 1.

EXAMPLES 7, 8, 9, 10 AND 11, COMPARATIVE EXAMPLES 9 AND 10

Films were prepared in the manner of Example 1 except, as pigments, 0.1%, by weight, milled and classified CaHPO$_4$ was substituted for calcium carbonate. The average size of the CaHPO$_4$ was 1.0 μm in Example 7, 1.5 μm in Eample 8, 4.0 μm in Example 9, 7.0 μm in Example 10, 10.0 μm in Example 11, 0.7 μm in Comparative Example 9 and 12.0 μm in Comparative Example 10. These inert pigments were finely dispersed in films.

It is clear that the average size of inert pigments should be within the scope of this invention as defined herein, in order to improve abrasion resistance, as summarized in Table 2.

EXAMPLES 12 AND 13, COMPARATIVE EXAMPLE 11

The polymer of Comparative Example 1 included only polyester particles containing lithium, calcium and phosphorus as recited in this invention. The amount of particles was 0.5%, by weight. On the other hand, the polymers of Comparative Examples 4 and 5 included only inert pigments. Mixed polymers of Comparative Examples 1, 4 and 5 were extruded and films were prepared in the manner of Example 1. The films of Examples 12, 13 and Comparative Example 11 had, 0.03%, 0.05% and 0.1%, respectively, by weight, polyester particles and all films had 0.3% calcium carbonate.

It is clear that the amount of polyester particles should be within the scope of this invention to improve the abrasion resistance as summarized in Table 3.

EXAMPLE 14

A film was prepared in the manner of Example 1, except that 0.08 parts of lithium chloride and 0.15 parts of dimethyl phenylphosphonate were substituted for lithium acetate and trimethylphosphate. The formed polyester particles are within the scope of this invention and the film had improved abrasion resistance as indicated in Table 1.

EXAMPLE 15, COMPARATIVE EXAMPLE 12

Thin layers of magnetic dispersion coating were applied to the films of Example 1 and Comparative Example 8 utilizing a rotogravure coater. The films with wet coatings passed through a magnetic field of alignment equipment and were dried in an air-oven at a temperature lower than 110° C. The dried coated films were then calendered carefully, utilizing five-roll calendering equipment, and were cut to 1.27 cm wide tapes utilizing a rotary knife. The thickness of the magnetic coating layers of the finished tape was 5 μm.

The magnetic dispersion coating used above had the following solid components and was prepared by the following procedure.

| | | |
|---|---|---|
| γ-Fe$_2$O$_3$ | 100 | parts |
| Carbon black | 4 | |
| Vinyl Chloride-Vinylacetate copolymer[1] | 20 | |
| Elastomeric polyurethane[2] | 7.5 | |
| Additives[3] | 4.5 | |

[1] Sold under trade name of VAGH by Nagase Sangyo Co., as a type of Union Carbide Viryl Resin, and contained approximately 91% vinylchloride, 9% vinyl acetate (partially saponified.)
[2] Sold under trade name of Estane 5702 by Japan Geon Co., and made by reacting p,p'-diphenylmethane di-isocyanate and adipic-acid-1,4-butane diol polyester.
[3] dispersing agent, lubricant and stabilizing agent.

Procedure: A slurry grind was first made by combining all of the above components except most of the vinylchloride-vinylacetate copolymer and all of the elastomeric polyurethane in a solvent mixture consisting of methyl ethyl ketone, methylisobutyl ketone and toluol. This slurry was ground for 48 hours. At the end of this time, a solution of vinyl chloride-vinylacetate copolymer and elastomeric polyurethane dissolved in methylethyl ketone, methylisobutyl ketone and toluol was added and the resulting material was ground for another 24 hours.

The occurrence of "drop out" and properties of these tapes in motion were measured. The tape made from the film of Example 15 had outstanding, highly improved properties, as is summarized in Table 4.

TABLE 1

| | | Pigments | | | | | |
|---|---|---|---|---|---|---|---|
| | Amounts of Li, Ca, P Compounds (parts) | Calcium Carbonate (weight %) | Silica (weight %) | Static Coefficient of Friction | Density of Surface Protrusions (per mm) | Maximum Surface Roughness (μm) | "White Powder" (rank) |
| Example 1 | lithium acetate 0.15 calcium acetate 0.09 trimethylphosphate 0.13 | 0.03 | | 0.52 | 48 | 0.26 | 1 |
| 2 | same as above | 0.001 | | 0.56 | 45 | 0.25 | 2 |
| 3 | same as above | 0.003 | | 0.55 | 46 | 0.25 | 1 |
| 4 | same as above | 0.1 | | 0.50 | 50 | 0.28 | 1 |
| 5 | same as above | 0.5 | | 0.46 | 60 | 0.29 | 1 |
| 6 | same as above | 0.7 | | 0.45 | 63 | 0.30 | 2 |
| Comparative Example 1 | same as above | 0 | | 0.64 | 42 | 0.15 | 5 |
| 2 | same as above | 0.0008 | | 0.62 | 43 | 0.20 | 4 |
| 3 | same as above | 1.0 | | 0.43 | 68 | 0.32 | 4 |
| Comparative Example 4 | trimethylphosphate 0.13 | 0.03 | | 1.8 | 7 | 0.26 | 5 |
| 5 | same as above | 0.5 | | 0.60 | 22 | 0.30 | 4 |
| 6 | calcium acetate 0.09 trimethylphosphate 0.13 | 0.03 | | 0.58 | 28 | 0.27 | 5 |
| 7 | same as above | 0.1 | | 0.55 | 32 | 0.32 | 3.5 |
| 8 | trimethylphosphate 0.13 | 0.03 | 0.3 | 0.58 | 52 | 0.27 | 3.5 |
| Example 14 | lithium chloride 0.08 calcium acetate 0.09 dimethyl phenylphosphonate 0.15 | 0.03 | | 0.50 | 52 | 0.29 | 1 |

TABLE 2

| EXAMPLE | Amounts of Li, Ca, P Compounds (parts) | Pigments Average Size of CaHPO$_4$ ($\mu$m) | Static Coefficient of Friction | Density of Surface Protrusions (per mm) | Maximum Surface Roughness ($\mu$m) | "White Powder" Rank |
|---|---|---|---|---|---|---|
| 7 | lithium acetate 0.15 calcium acetate 0.09 trimethylphosphate 0.13 | 1.0 | 0.58 | 60 | 0.18 | 2 |
| 8 | same as above | 1.5 | 0.53 | 53 | 0.23 | 1 |
| 9 | same as above | 4.0 | 0.50 | 45 | 0.30 | 1 |
| 10 | same as above | 7.0 | 0.49 | 44 | 0.32 | 1 |
| 11 | same as above | 10.0 | 0.49 | 43 | 0.40 | 2 |
| Comparative 9 | same as above | 0.7 | 0.60 | 68 | 0.16 | 4 |
| Comparative 10 | same as above | 12.0 | 0.47 | 42 | 0.52 | 4 |

TABLE 3

| EXAMPLE | Amount of Polyester Particles (wt. %) | Pigments Calcium Carbonate Weight % | Static Coefficient of Friction | Density of Surface Protrusions (per mm) | Maximum Surface Roughness ($\mu$m) | "White Powder" Rank |
|---|---|---|---|---|---|---|
| 12 | 0.05 | 0.3 | 0.75 | 18 | 0.28 | 2 |
| 13 | 0.1 | 0.3 | 0.65 | 20 | 0.29 | 1 |
| Comparative 11 | 0.03 | 0.3 | 0.80 | 17 | 0.28 | 4 |

TABLE 4

| Example | Properties of Tape in Motion | Number of "drop out" (per minute) |
|---|---|---|
| 15 | Very Good | 5 |
| Comparative 12 | formation of "white powder" on guide roll | 60 |

We claim:

1. A biaxially oriented polyester film for magnetic tape, said film consisting essentially of ethylene terephthalate units, said film including discrete polyester particles in the form of a metal-polymer complex in an amount of from about 0.05% to 1.0%, based on the weight of film, said particles having an average size in the range of about 0.1 to 3.0 $\mu$m and containing about 0.03% to 5.0% of elemental lithium, about 0.03% to 5.0% of elemental calcium and about 0.03% to 10.0% of elemental phosphorus, said percentages being based on the total weight of the polyester particles, and said film also including inert pigments in an amount of about 0.001% to 0.7% based on the weight of said film, said inert pigments being selected from the group consisting of oxides and salts of metals in Groups II, III, and IV of the Periodic Table, and having an average size in the range of about 1.0 to 10.0 $\mu$m.

2. A biaxially oriented polyester film for magentic tape according to claim 1 in which polyester particles contain about 0.05 to 4.0 weight % of lithium, about 0.05 to 4.0 weight % of calcium, about 0.05 to 7.5 weight % of phosphorus.

3. A polyester film for magnetic tape according to claim 1 in which the quantity of polyester particles in the film is about 0.1 to 0.5 weight %.

4. A polyester film for magnetic tape according to claim 1 in which the quantity of inert pigments in the film is about 0.003 to 0.5 weight %.

5. A polyester film for magnetic tape according to claim 1 in which the average size of the polyester particles in the film is about 0.6 to 2.5 $\mu$m.

6. A polyester film for magnetic tape according to claim 1 in which the average size of inert pigments in the film is about 1.5 to 7.0 $\mu$m.

7. A polyester film for magnetic tape according to claim 1 in which the average size of inert pigments is greater than that of the polyester particles.

8. A polyester film for magnetic tape according to claim 1 in which the maximum surface roughness of the film is about 0.05 to 0.5 $\mu$m and the density of surface protrusions is at least about 20 per mm.

9. A polyester film for magnetic tape according to claim 1 in which the maximum surface roughness of the film is about 0.05 to 0.35 $\mu$m and the density of surface protrusions is at least about 20 per mm.

10. A polyester film for magnetic tape according to claim 1 in which the maximum surface roughness of the film is about 0.05 to 0.35 $\mu$m and the density of surface protrusions is at least about 30 per mm.

11. A polyester film for magnetic tape according to claim 8 in which the number of rough protrusions having a height in the range of about 0.35 to 5.0 $\mu$m is equal to or less than about 10 per mm$^2$.

12. A polyester film for magnetic tape according to claim 1 in which said inert pigments are calcium carbonate.

13. A polyester film for magnetic tape according to claim 1 in which said inert pigments are CaHPO$_4$.

14. A polyester film for magnetic tape according to claim 1 in which the lithium compound added to form polyester particles is lithium acetate.

15. A polyester film for magnetic tape according to claim 1 in which the calcium compound added to form polyester particles is calcium acetate.

16. A polyester film for magnetic tape according to claim 1 in which the phosphorus compound added to form polyester particles is trimethylphosphate.

* * * * *

UNITED STATES PATENT OFFICE
CERTIFICATE OF CORRECTION

PATENT NO. : 4,138,386
DATED : February 6, 1979
INVENTOR(S) : Masahiko Motegi et al It is certified that error appears in the above-identified patent and that said Letters Patent are hereby corrected as shown below:

Column 1, line 11, delete "electric" and insert therefor --electrical--.

Column 7, line 55, delete "dand" and insert therefor --and--.

Signed and Sealed this

First Day of May 1979

[SEAL]

Attest:

RUTH C. MASON
Attesting Officer

DONALD W. BANNER
Commissioner of Patents and Trademarks